(No Model.)

W. McCARTHY.
NUT LOCK.

No. 431,705. Patented July 8, 1890.

Witnesses
H. A. Lamb
Alvin Belt

Inventor
William McCarthy
By his Attorney
Geo. T. Whitney

UNITED STATES PATENT OFFICE.

WILLIAM McCARTHY, OF DRINKER, PENNSYLVANIA.

NUT-LOCK.

SPECIFICATION forming part of Letters Patent No. 431,705, dated July 8, 1890.

Application filed February 15, 1890. Serial No. 340,557. (No model.)

*To all whom it may concern:*

Be it known that I, WILLIAM MCCARTHY, a citizen of the United States, residing at Drinker, in the county of Lackawanna and State of Pennsylvania, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to devices for preventing nuts from becoming loose on their bolts, and while it is adapted to various structures in which nuts are used, yet it is especially designed for the rail-joints of railway-tracks.

The object of my invention is to provide a nut-lock that will hold the nuts securely; that will not rattle and injure the thread on the bolts in case they become loose, but will automatically take up the wear of splice-bars and bolts; that will not be affected by expansion and contraction of the rails; that takes the place of the washers; that can be used over and over again without injury to itself or to the nuts and bolts; that can be quickly removed when repairs are to be made, and that will permit the nuts to be tightened up without removing the lock from the rails.

Figure 1:
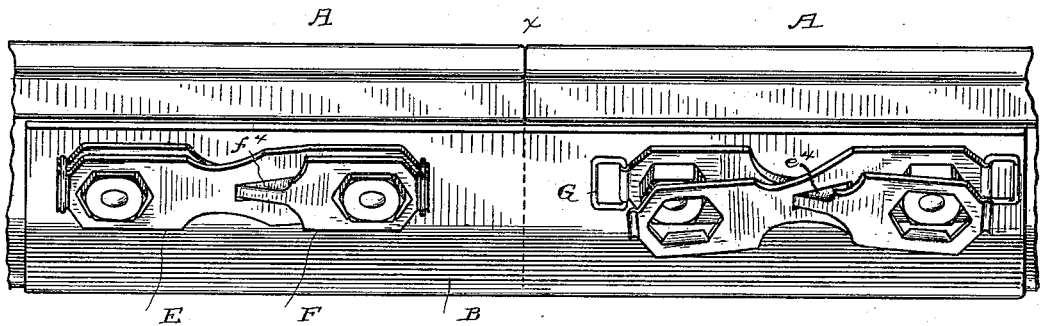
Figure 2:
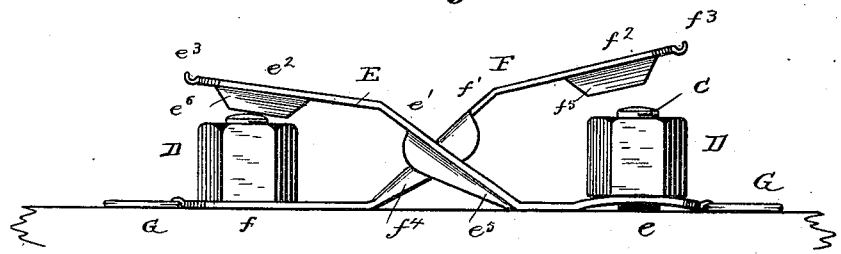
Figure 3:
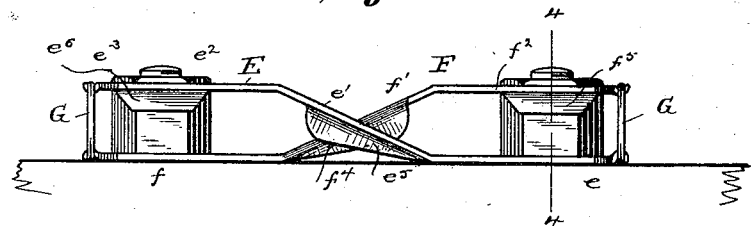
Figure 4:
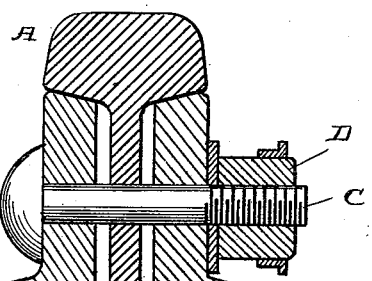

In the drawings, Figure 1 is a perspective side view of a rail-joint provided with my improved nut-lock. Fig. 2 is a side elevation with one nut screwed down tight and the other one loose. Fig. 3 shows both nuts tight and the lock applied; and Fig. 4 is a cross-section on the line 4 4, Fig. 3.

The same reference-letters are used in all the figures.

The rails A A, splice-bars B B, bolts C, and nuts D are of any preferred construction.

My improved lock is designed to be applied to two adjacent nuts, and since it is customary to use two nuts on each side of the joint $x$ it follows that two of my locking devices are necessary for each joint-fastening.

My device comprises, preferably, four parts— to wit, two locking-levers E F, preferably composed of spring-steel, and two links G. Each lever has a base $e f$, in which is a suitable hole for the bolt C to pass through. The bases are normally arched, as shown at the right hand of Fig. 2, in order to act as spring-washers. Each base has hinged to one side of it a link G, preferably rectangular, with rounded corners. From the other side of each base extends an arm $e' f'$, inclined upwardly at an angle with the base. The end portion of each arm is preferably provided with a collar $e^2 f^2$, shaped to fit the nut to which it is to be applied. At the end of the arm is a hook $e^3 f^3$, adapted to engage with a link G or other suitable retaining device. When these two levers are placed upon their bolts, and the nuts screwed down until they touch the crown of the arched bases, the arms $e' f'$ stand across each other in the form of the letter X, the collars $e^2 f^2$ lying nearly over the nuts. In practice the levers used for an eighty or one hundred pound rail are about eight and three-quarters inches long, the arms being five and three-eighths inches in length from the base to the hook. When applied as above described, the nuts not being tightened, the hooks stand about two inches above the bases, as illustrated on the left of Fig. 2. Upon tightening up the nuts the bases are flattened down against the splice-bars, as shown at the left of Fig. 2. This throws the hooks upward until in the side of the lever above mentioned they stand about two and one-half inches above the bases, as illustrated at the right of Fig. 2. The levers are now forced toward the bases until the links G can be engaged with the hooks, the links being in the instance above referred to about one inch high. In this position the collars $e^2 f^2$ encompass the nuts and prevent them from turning, as illustrated in Fig. 3.

It will be observed that the nuts are subjected to a strong outward tension, due not only to the resilience of the bases $e f$, which act as spring-washers, but also to the reaction of the arms $e' f'$, which exert a strong pull on the links G, and also a powerful leverage on the nuts. To explain this more fully, refer again to the specific levers mentioned above, the length of whose arms is five and three-eighths inches. From the center of the bolt to the edge of the base where the arm leaves it is two inches. Considering the edge of the base at this point as a fulcrum, any force applied to the hook will be multiplied about two and a half times at the center of the bolt-hole in the base. Suppose it requires a pressure of twenty-five pounds to bring down the lever-arm so that it can be engaged by the link, and suppose, further, that each arched base exerts a lifting-pressure of twenty-five pounds when the nut is tightened upon it. There will then be a lifting effect upon each nut of about sixty-two pounds due to the leverage, twenty-five due to the resilience of the base, and about forty-five due to the left on the link by the other lever, the base acting as a short lever fulcrumed at that side of the nut opposite to the link. This gives a total of one hundred and thirty-two pounds (more or less) exerted to strip the nut off the bolt, which is ample to keep the parts perfectly tight and proof against rattling in spite of wear. While it is evident that the levers might cross each other side by side, yet I prefer to make the lever F as shown in the drawings, with its arm $f'$ narrower than the base and socket, in order to permit it to play in a slot $e^4$, cut in the arm $e'$ of the lever E, the slot being long enough to allow the base $f$ to be passed through it when the levers are to be interlocked. The narrow portion of the lever F is strengthened by flanges $f^4$, turned down along each side of it, while the arm $e'$ is similarly stiffened by flanges $e^5$, turned down along the edges of the slot $e^4$. Similarly the collars are formed by cutting a suitable hole in the end of each lever, the metal being turned down on one or more of its edges, as at $f^5$ $e^6$, to stiffen it and give a good bearing on the sides of the nut.

It will be readily seen that the various advantages above set forth for my invention are all attained by the construction that I have described. I prefer to use two levers for each pair of nuts, though it is evident that by immaterial modifications one lever would be sufficient. When the nuts need tightening, the links can be thrown off, allowing the collars to lift off the nuts and leaving them accessible by a wrench.

Having thus described my invention, what I claim, and desire to secure by Letters Patent, is—

1. A nut-locking device comprising a pair of separate spring-levers, each having a normally-arched base and an arm standing with its outer end normally at a considerable distance from the plane of the base, a hook on each base, and means for connecting with each hook the end of the arm on the other base, said arm being thereby held down near the plane of the base and exerting an upward lift on the nut additional to that due to the arched base, substantially as described.

2. The combination, with two adjacent bolts and nuts, of a pair of spring-levers having bases to underlie the nuts, an arm extending at an angle from each base to a point near and normally above the other nut, said arms having collars to encompass the nuts, a hook on each base, and means for connecting the free ends of the levers with said hooks when the collars have been brought down around the nuts, substantially as described.

3. The combination, with two adjacent bolts and nuts, of a pair of spring-levers, each having a normally-arched base to underlie a nut and act as a spring-washer, an arm extending outward from said base and provided with a hook, and a link hinged to each base and adapted to engage with the hook of the other lever, substantially as described.

4. The combination, with a pair of bolts and nuts, of a pair of spring-levers, each having a base to underlie a nut, an arm extending outwardly from said base, a collar at the end of the arm adapted to encompass the other nut, a hook beyond the collar, and a link hinged to the base and adapted to engage with the hook of the other lever, substantially as described.

5. A nut-locking device consisting of a lever E, having an arched base $e$, an arm $e'$, a hook $e^3$, and a slot $e^4$, a lever F, having an arched base $f$, adapted to play in the slot $e^4$, and hook $f^3$ and links G, hinged to the bases $e f$, substantially as described.

6. A nut-locking device consisting of the interlocked spring-levers E F, having links G hinged to their bases and provided with hooks $e^3 f^3$, substantially as described.

7. A nut-locking device consisting of the interlocked spring-levers E F, having collars $e^2 f^2$, and means for fastening the end of each lever to the base of the other, substantially as described.

8. The interlocked levers E F, one having the slot $e^4$, provided with flanges $e^5$, and the collar $e^2$, having flanges $e^6$, and the other having the stiffening-flanges $f^4$ and a collar $f^2$, provided with flanges $f^6$, substantially as described.

9. The combination, with two adjacent bolts and nuts, of a pair of spring-levers having bases to underlie the nuts, and arms adapted to extend from the bases to points near and normally above the opposite nuts, and retaining devices for holding the spring-levers down under tension near the plane of the bases, substantially as described.

In testimony whereof I affix my signature in presence of two witnesses.

WILLIAM McCARTHY.

Witnesses:
ALMON C. MITCHELL,
JAMES McCARTHY.